(12) United States Patent
Yamada (10) Patent No.: US 10,707,717 B2
(45) Date of Patent: Jul. 7, 2020

(54) STATOR AND RESOLVER

(71) Applicant: MINEBEA MITSUMI Inc., Nagano (JP)

(72) Inventor: Naohiro Yamada, Yokohamashi (JP)

(73) Assignee: MINEBEA MITSUMI INC., Nagano (JP)

( * ) Notice: Subject to any disclaimer, the term of this patent is extended or adjusted under 35 U.S.C. 154(b) by 97 days.

(21) Appl. No.: 15/958,372

(22) Filed: Apr. 20, 2018

(65) Prior Publication Data

US 2018/0316235 A1   Nov. 1, 2018

(30) Foreign Application Priority Data

Apr. 28, 2017   (JP) .................................. 2017-090647

(51) Int. Cl.
| | | |
|---|---|---|
| *H02K 3/52* | (2006.01) | |
| *H02K 5/22* | (2006.01) | |
| *H02K 3/34* | (2006.01) | |
| *H02K 15/10* | (2006.01) | |
| *H02K 5/08* | (2006.01) | |
| *H02K 1/14* | (2006.01) | |

(52) U.S. Cl.
CPC ............. *H02K 3/521* (2013.01); *H02K 1/146* (2013.01); *H02K 3/34* (2013.01); *H02K 3/522* (2013.01); *H02K 5/08* (2013.01); *H02K 5/225* (2013.01); *H02K 15/10* (2013.01); *H02K 2203/09* (2013.01)

(58) Field of Classification Search
CPC .. H02K 3/00; H02K 3/34; H02K 3/52; H02K 3/521; H02K 3/522; H02K 5/00; H02K 5/08; H02K 5/22; H02K 5/225; H02K 15/00; H02K 15/10
See application file for complete search history.

(56) References Cited

U.S. PATENT DOCUMENTS

| | | | |
|---|---|---|---|
| 2004/0119350 A1* | 6/2004 | Miya ...................... | H02K 3/522 310/71 |
| 2008/0036315 A1* | 2/2008 | Makiuchi ............... | H02K 3/522 310/71 |

FOREIGN PATENT DOCUMENTS

JP   2003-219594 A   7/2003

* cited by examiner

*Primary Examiner* — Tran N Nguyen
(74) *Attorney, Agent, or Firm* — Pearne & Gordon LLP (57) ABSTRACT

A stator according to an embodiment includes a stator core that includes a plurality of teeth that extend from a ring-shaped body part in one radial direction thereof, an insulator that covers the plurality of teeth from both sides in an axial direction of the stator core, a coil that is wound around each of the plurality of teeth via the insulator, a terminal block part that extends from the insulator in a radial direction opposite to the one radial direction, includes a plurality of terminals with a terminal end of a winding wire that composes the coil being bound to one end thereof, and is formed integrally with the insulator, and a connector housing that includes a connection part for the terminal block part, stores another end of each of the plurality of terminals, and is connected to an external connector.

9 Claims, 10 Drawing Sheets

STATOR AND RESOLVER

CROSS-REFERENCE TO RELATED APPLICATION

The present application claims priority to and incorporates by reference the entire contents of Japanese Patent Application No. 2017-090647 filed in Japan on Apr. 28, 2017.

BACKGROUND OF THE INVENTION

1. Field of the Invention

The present invention relates to a stator and a resolver.

2. Description of the Related Art

A resolver has conventionally been known that detects a rotation angle of a rotary shaft of a motor, an electrical generator, or the like. For example, a resolver includes a rotor that is fixed on a rotary shaft of a motor, an electrical generator, or the like, and a stator that is fixed on a housing or the like. A stator includes a stator core that is provided with a ring-shaped body and a plurality of teeth that extend in a radial direction of the ring-shaped body. A rotor has a rotationally asymmetric shape and is arranged so as to face a plurality of teeth of a stator core in a radial direction of a ring-shaped body of the stator core. A plurality of teeth of a stator core is provided with a coil (a winding wire wound thereon). A coil includes an excitation winding wire that is externally supplied with excitation current and an output winding wire that outputs a signal depending on a rotation angle of a rotor. An output winding wire includes a winding wire that outputs a sin-phase signal and a winding wire that outputs a cos-phase signal.

As a rotor is caused to rotate with rotation of a rotary shaft of a motor, an electrical generator, or the like in a state where excitation current is applied to an excitation winding wire, a size of a gap between the rotor and a plurality of teeth of a stator core is changed with rotation of the rotor. A voltage dependent on a change in a size of a gap between a rotor and a plurality of teeth of a stator core is generated on an output winding wire. A voltage that is generated on an output winding wire is a signal dependent on a rotation angle of a rotor, and hence, the voltage that is generated on the output winding wire is detected, so that it is possible to detect a rotation angle of a rotary shaft of a motor, an electrical generator, or the like.

A stator may include an insulator that provides insulation between a plurality of teeth of a stator core and a coil. A stator may include a terminal pin that is connected to a coil and a connector housing that surrounds the terminal pin to compose a connector. In a case where a resolver is used in, for example, a comparatively severe environment such as high temperature, an insulator and a connector housing are preferably formed integrally with a stator core or the like by means of insert molding. Herein, a connector housing is formed integrally with an insulator.

For example, a stator is configured in such a manner that each insulating plate is formed integrally with an insulating mold body and a wall part is formed outside the insulating mold body, so that such a wall part composes a female side of a connector and is capable of accepting a male side of such a connector (see, for example, Japanese Laid-open Patent Publication No. 2003-219594).

However, in a case where a connector housing as well as an insulator is formed integrally with a stator core or the like, a shape of a die for molding a stator is complicated. Accordingly, a cost of a die for molding a stator is increased.

Furthermore, a shape of a connector that is connected to a stator may be different for a model, a type, or a user of a resolver. In such a case, a die is prepared where only a shape of a connector housing is different.

Accordingly, a cost of a die for molding a stator is increased.

SUMMARY OF THE INVENTION

A stator according to an embodiment includes a stator core that includes a plurality of teeth that extend from a ring-shaped body part in one radial direction thereof, an insulator that covers the plurality of teeth from both sides in an axial direction of the stator core, a coil that is wound around each of the plurality of teeth via the insulator, a terminal block part that extends from the insulator in a radial direction opposite to the one radial direction, includes a plurality of terminals with a terminal end of a winding wire that composes the coil being bound to one end thereof, and is formed integrally with the insulator, and a connector housing that includes a connection part for the terminal block part, stores another end of each of the plurality of terminals, and is connected to an external connector.

DETAILED DESCRIPTION OF THE PREFERRED EMBODIMENTS

Hereinafter, a stator and a resolver according to an embodiment(s) will be described with reference to the drawings. This invention is not limited by such an embodiment(s). In each drawing, an identical or corresponding element will be provided with an identical sign appropriately.

First Embodiment

Figure 1:
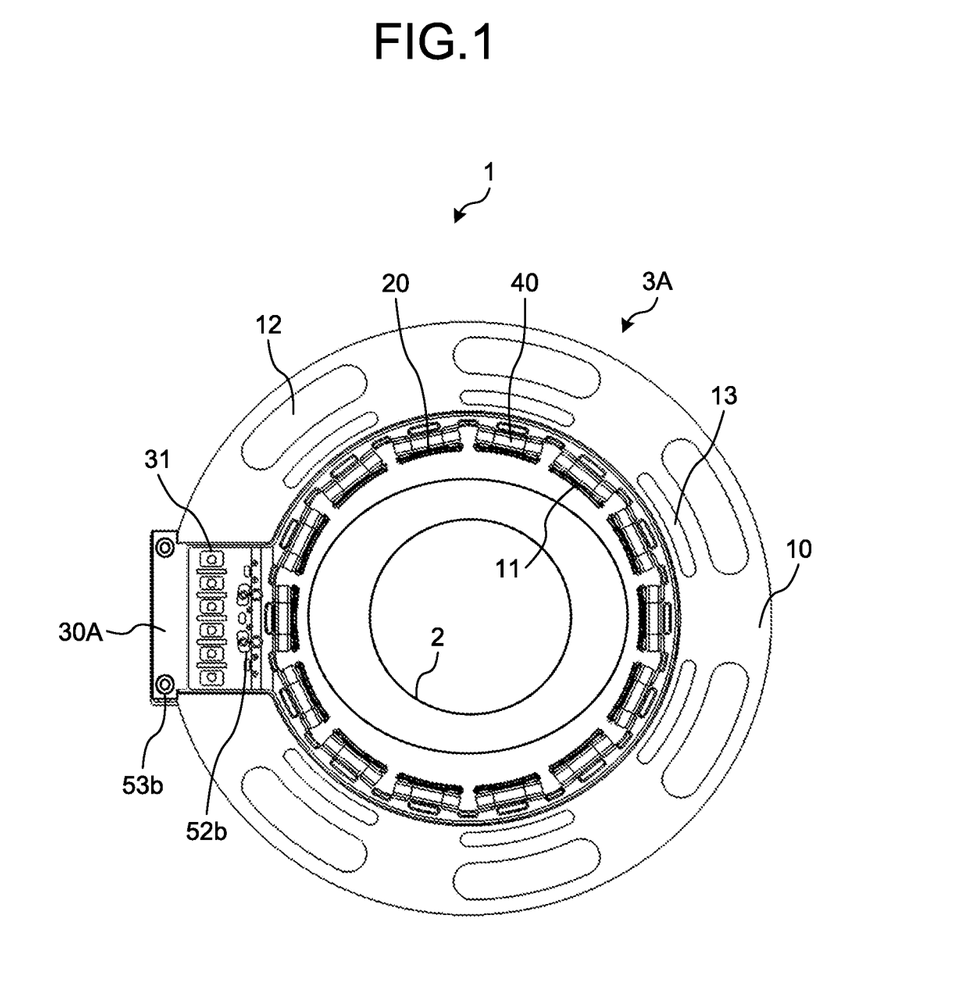
FIG. 1 is a plan view illustrating a resolver according to a first embodiment.

FIG. 1 is a plan view illustrating a resolver 1 according to a first embodiment. As illustrated in FIG. 1, the resolver 1 according to the first embodiment is a variable reluctance (VR) type resolver that includes a rotor 2 and a stator 3A. The stator 3A may include a coil cover that covers a coil that is provided on the stator 3A as described later.

The rotor 2 has a laminate structure that is obtained by laminating a plurality of steel plate cores that are formed of a soft magnetic material such as a silicon steel plate. The rotor 2 is mounted on a rotary shaft of a non-illustrated motor, electrical generator, or the like. The rotor 2 as illustrated in FIG. 1 is arranged inside the stator 3A. That is, the resolver 1 as illustrated in FIG. 1 is an inner rotor type resolver. In the resolver 1 as illustrated in FIG. 1, an axial direction is identical to an axial direction of a rotary shaft of a motor, an electrical generator, or the like that is connected to the rotor 2. A radial direction is identical to a direction that is orthogonal to such an axial direction. A radial direction means any direction that is parallel to a plane that is orthogonal to an axial direction.

The stator 3A includes a stator core 10, an insulator 20, a terminal block part 30A, a coil 40, and a non-illustrated connector housing. The stator core 10 is obtained by laminating a predetermined number of steel plate cores that are formed of a soft magnetic material such as a silicon steel plate in an axial direction thereof. The stator core 10 has a plurality of teeth 11 that extend from a ring-shaped part that is a ring-shaped body part in one radial direction thereof. In the inner rotor type resolver 1, the stator core 10 has the plurality of teeth 11 that extend inward in a radial direction from a ring-shaped part that is a ring-shaped body part. Although the stator core 10 as illustrated in FIG. 1 has fourteen teeth 11, the number of teeth 11 of the stator core 10 is not particularly limited. The plurality of teeth 11 are arranged equiangularly in a circumferential direction of a ring-shaped part. A tip of each of teeth 11 has a tip part that extends in a circumferential direction. A space (a slot) is formed between adjacent teeth 11.

The insulator 20 is a member with an insulation property. The insulator 20 is molded by means of, for example, injection molding of a resin with an insulation property. The insulator 20 covers the plurality of teeth 11 from both sides of the stator core 10 in an axial direction thereof. The insulator 20 has a flange part that covers a tip of each of the plurality of teeth 11 from both sides in an axial direction. The insulator 20 is formed integrally with the stator core 10 by means of insert molding.

The terminal block part 30A is a member that extends in a radial direction opposite to one radial direction where the plurality of teeth 11 extend from the insulator 20 therein. The terminal block part 30A is a member that is formed integrally with the insulator 20. The terminal block part 30A is molded integrally with the insulator 20 by means of injection molding of a resin with an insulation property. The stator 3A as illustrated in FIG. 1 has the terminal block part 30A that extends outward in a radial direction of the stator core 10.

The terminal block part 30A has a plurality of terminals (terminal pins) 31. For example, the terminal block part 30A as illustrated in FIG. 1 has six terminals 31. A terminal end of a winding wire that composes a corresponding coil 40 is bounded to one end of each of the terminals 31. A part of a winding wire that is bounded to one end of each of the terminals 31 is electrically connected to such a terminal 31 by means of, for example, TIG welding (tungsten-inert gas welding). Another end of each of the terminals 31 protrudes into an interior of a connector housing. Another end of each of the terminals 31 is connected to an external connector.

The coil 40 is a winding wire that is wound around each of the plurality of teeth 11 via the insulator 20. The coil 40 is composed of an excitation winding wire that is a winding wire for inputting an excitation signal and an output winding wire that is a winding wire for outputting a two-phase signal depending on a rotation angle θ of the rotor 2. An output winding wire is composed of a sin-phase output winding wire that is a winding wire for outputting a sin-phase signal dependent on sin θ and a cos-phase output winding wire that is a winding wire for outputting a cos-phase signal dependent on cos θ.

A connector housing that is not illustrated in FIG. 1 is, for example, a male type connector housing that is connected to the terminal block part 30A for connecting the terminals 31 to a female type external connector. A connector housing will be described later.

Figure 2A:
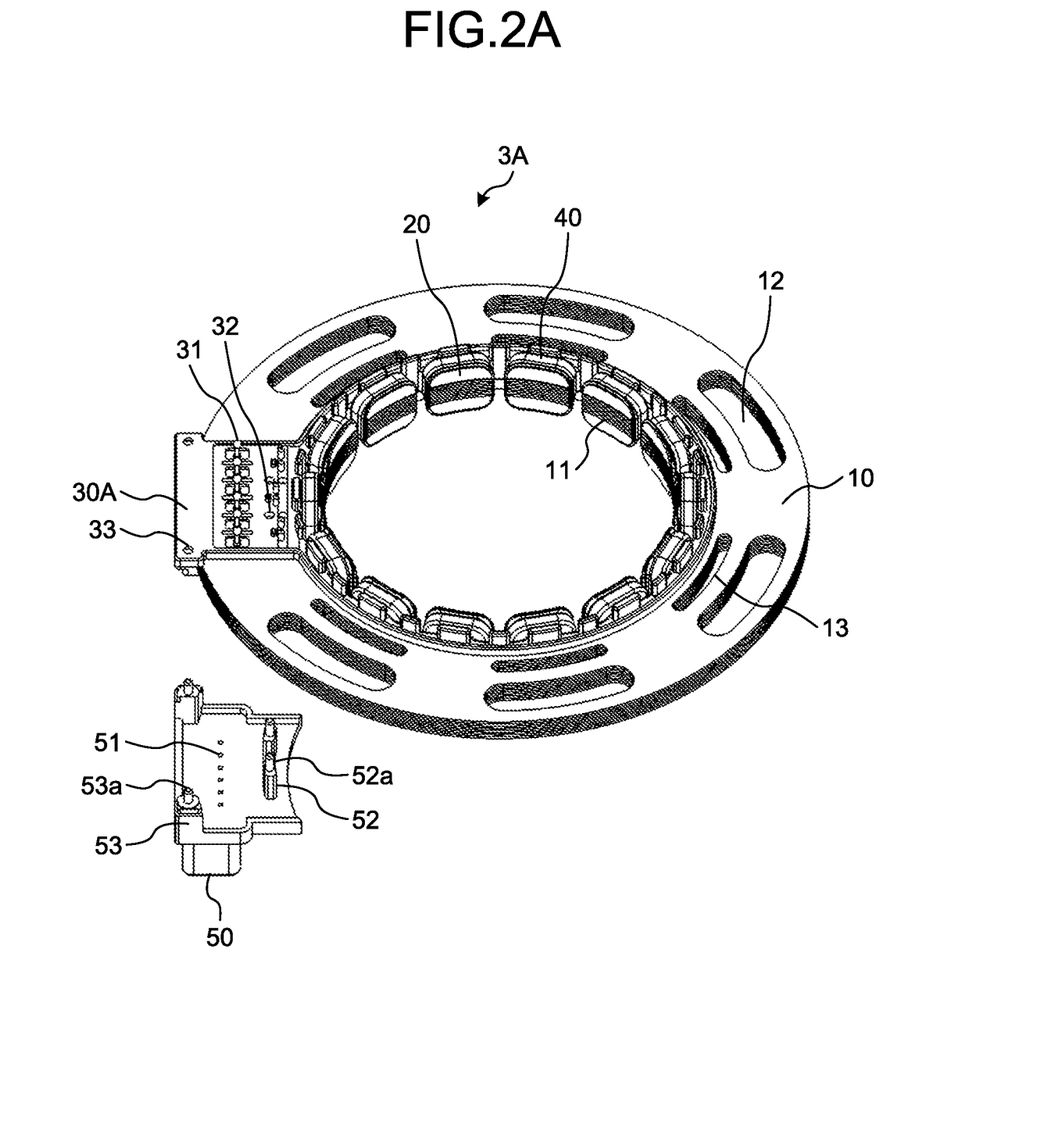
FIG. 2A is an exploded perspective view illustrating a stator according to a first embodiment when viewed from a top surface thereof.
Figure 2B:
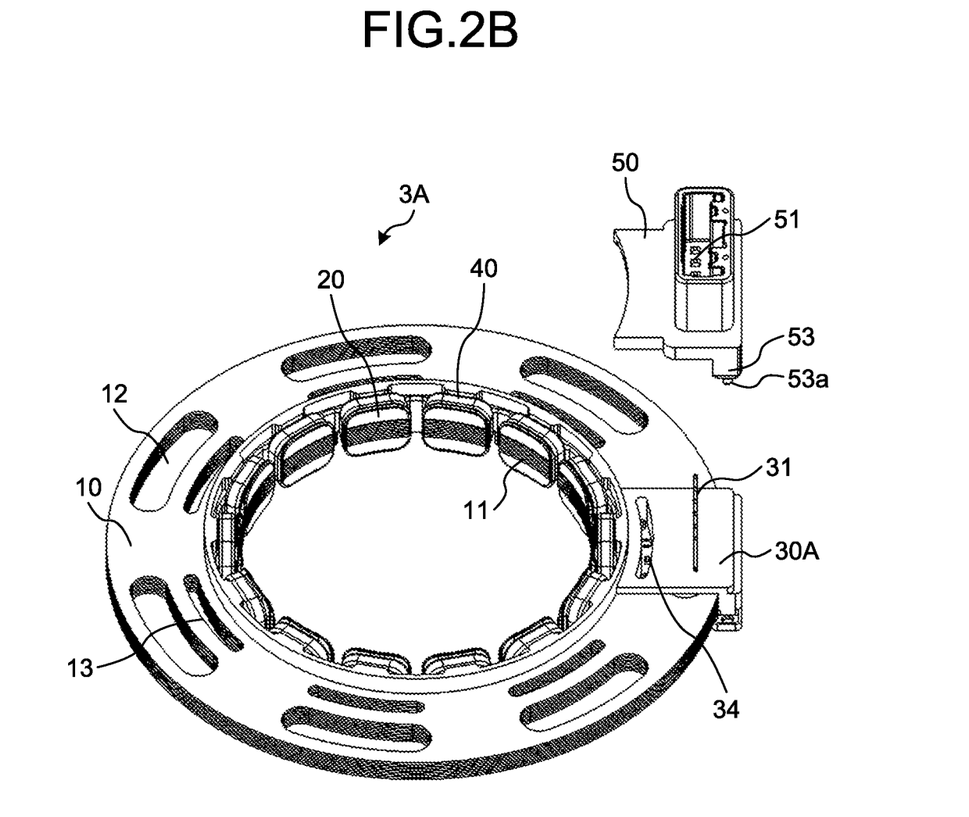
FIG. 2B is an exploded perspective view illustrating a stator according to a first embodiment when viewed from a bottom surface thereof.

FIG. 2A is an exploded perspective view illustrating a stator 3A according to the first embodiment when viewed from a top surface thereof. FIG. 2B is an exploded perspective view illustrating a stator 3A according to the first embodiment when viewed from a bottom surface thereof. FIG. 2A and FIG. 2B illustrate the stator 3A before a connector housing 50 is connected to a terminal block part 30A.

As illustrated in FIG. 2A and FIG. 2B, the stator 3A includes a stator core 10, an insulator 20, a terminal block part 30A, a coil 40, and a connector housing 50. In the stator 3A as illustrated in FIG. 2A and FIG. 2B, the insulator 20 and the terminal block part 30A are formed integrally with the stator core 10 by means of, for example, molding of a resin. Furthermore, the terminal block part 30A is formed integrally with the insulator 20 so as to extend from the insulator 20 in one of radial directions of the stator core 10. The coil 40 is wound around a plurality of teeth of the stator core 10 via the insulator 20. On the other hand, in the stator 3A according to the first embodiment, the connector housing 50 is formed separately from the stator core 10, the insulator 20, and the terminal block part 30A.

A through-hole 12 and a through-hole 13 are formed in a body part of the stator core 10 equiangularly in a circumferential direction of the stator core 10. The through-hole 12 is, for example, an arc-shaped through-hole for inserting a mounting screw for mounting the stator core 10 through a housing or the like. The through-hole 13 is an arc-shaped through-hole for inserting a jig pin of a jig for manufacturing the stator 3A therethrough. In the stator 3A for such an inner rotor type resolver 1, the through-hole 13 is formed inside in a radial direction with respect to the through-hole 12.

Any of a shape of the through-hole 12 and a shape of the through-hole 13 is not limited to an arc shape but may be a linear shape. In the stator 3A as illustrated in FIG. 2A and FIG. 2B, any of the number of through-holes 12 and the number of through-holes 13 is seven (where one through-hole 12 and one through-hole 13 that are not illustrated in the figure(s) are formed in a part that is covered by the terminal block part 30A). Any of the number of through-holes 12 and the number of through-holes 13 is not limited but may be less than or equal to six or greater than or equal to eight.

The terminal block part 30A has a shape (a U-shape) so as to interpose the stator core 10 from an outside in a radial direction of the stator core 10. A plurality of terminals (terminal pins) 31 are implanted in the terminal block part 30A by means of insert molding of the plurality of terminals 31. A terminal end of a winding wire that composes a corresponding coil 40 is bounded to one end of each of the terminals 31. Another end of each of the terminals 31 protrudes into an interior of the connector housing 50.

A first through-hole 32 that overlaps with the through-hole 13 of the stator core 10 is formed in the terminal block part 30A on a side of one end of the plurality of terminals 31. Two first through-holes 32 are formed in the terminal block part 30A as illustrated in FIG. 2A and FIG. 2B so as to be positioned at both ends of the through-hole 13 of the stator core 10. The number of first through-holes 32 that are formed in the terminal block part 30A is not particularly limited and the number of first through-holes 32 may be one or greater than or equal to three.

A second through-hole 33 is formed in the terminal block part 30A on a side of one end of the plurality of terminals 31 in a radial direction opposite to one radial direction where a plurality of teeth 11 extend therein, that is, outward in a radial direction of the stator core 10, so as to be positioned outside the stator core 10. Two second through-holes 33 are formed in the terminal block part 30A as illustrated in FIG. 2A and FIG. 2B so as to be positioned at both ends of the terminal block part 30A in a tangential direction of an outer circumference of the stator core 10. The number of second through-holes 33 that are formed in the terminal block part 30A is not particularly limited and the number of second through-holes 33 may be one or greater than or equal to three.

A through-hole 34 is formed in the terminal block part 30A on a side of another end of the plurality of terminals 31. The through-hole 34 has a shape that corresponds to a shape of the through-hole 13 of the stator core 10. Shapes and the number of through-holes 34 are not particularly limited as long as it is possible to insert a first protrusion (that will be described later) that is provided on the connector housing 50 through the first through-hole 32. For example, shapes and the number of through-holes 34 may correspond to shapes and the number of first through-holes 32, respectively.

The connector housing 50 is a housing member for storing another end of each of the plurality of terminals 31. The connector housing 50 has a connection part for connecting to the terminal block part 30A. The connector housing 50 is connected to the terminal block part 30A on a side of another end of the plurality of terminals 31. As the connector housing 50 is connected to the terminal block part 30A, the connector housing 50 composes a male type connector that connects another end of the plurality of terminals 31 to a non-illustrated female type external connector. Thus, the connector housing 50 is connected to an external connector. The connector housing 50 is formed by means of, for example, molding of a resin. The connector housing 50 is molded so as to have a predetermined shape such as a rectangular or square connector or an oval connector.

The connector housing 50 has a plurality of through-holes 51 for inserting the plurality of terminals 31 therethrough at positions that correspond to the plurality of terminals 31. As the connector housing 50 is connected to the terminal block part 30A, another end of each of the terminals 31 is pressed into the plurality of through-holes 51 and thereby protrudes into an interior of the connector housing 50. Shapes and the number of the plurality of thorough-holes 51 correspond to shapes and the number of the plurality of terminals 31, respectively, in such a manner that the plurality of terminals 31 are inserted through the connector housing 50.

The connector housing 50 has, as a connection part, a first protrusion part 52 that is formed so as to penetrate through the through-hole 13 of the stator core 10 and the first through-hole 32. Positions, shapes, and the number of first protrusion parts 52 correspond to positions, shapes, and the number of first through-holes 32, respectively, in such a manner that the first protrusion parts 52 penetrate through the through-hole 13 of the stator core 10 and the first through-holes 32. The first protrusion part 52 has a shape in such a manner that a tip 52a of the first protrusion part 52 penetrates through the through-hole 13 of the stator core 10 and the first through-hole 32 and protrudes from the terminal block part 30A on a side of one end of the plurality of terminals 31. In the connector housing 50 as illustrated in FIG. 2A and FIG. 2B, the first protrusion part 52 includes two tips 52a that have a cylindrical shape (a pin shape). More specifically, two first protrusion parts 52 are formed on the connector housing 50 at positions that correspond to two first through-holes 32 that are provided so as to be positioned at both ends of the through-hole 13 of the stator core 10.

The connector housing 50 has, as a connection part, a second protrusion part 53 that is formed so as to penetrate through the second through-hole 33. Positions, shapes, and the number of second protrusion parts 53 correspond to positions, shapes, and the number of second through-holes 33, respectively, in such a manner that the second protrusion parts 53 penetrate through the second through-holes 33. The second protrusion part 53 has a shape in such a manner that a tip 53a of the second protrusion part 53 penetrates through the second through-hole 33 and protrudes from the terminal block part 30A on a side of one end of the plurality of terminals 31. In the connector housing 50 as illustrated in FIG. 2A and FIG. 2B, the second protrusion part 53 includes two tips 53a that have a cylindrical shape (a pin shape). More specifically, two second protrusion parts 53 are formed on the connector housing 50 at positions that correspond to two second through-holes 33 that are provided so as to be positioned at both ends of the terminal block part 30A in a tangential direction of an outer circumference of the stator core 10.

As the connector housing 50 is connected to the terminal block part 30A, a tip 52a of the first protrusion part 52 penetrates through the through-hole 13 of the stator core 10 and the first through-hole 32 and protrudes from the terminal block part 30A on a side of one end of the plurality of terminals 31. The tip 52a of the first protrusion part 52 that penetrates through the through-hole 13 of the stator core 10 and the first through-hole 32 and protrudes from the terminal block part 30A is fixed on the terminal block part 30A on a side of one end of the plurality of terminals 31.

As the connector housing 50 is connected to the terminal block part 30A, a tip 53a of the second protrusion part 53 penetrates through the second through-hole 33 and protrudes from the terminal block part 30A on a side of one end of the plurality of terminals 31. The tip 53a of the second protrusion part 53 that penetrates through the second through-hole 33 and protrudes from the terminal block part 30A is fixed on the terminal block part 30A on a side of one end of the plurality of terminals 31.

For a method of fixing the tip 52a of the first protrusion part 52 or the tip 53a of the second protrusion part 53 that protrudes from the terminal block part 30A, caulking fixation is provided such as thermal caulking, infrared caulking, or ultrasonic caulking. The tip 52a of the first protrusion part 52 or the tip 53a of the second protrusion part 53 that protrudes from the terminal block part 30A is caulking-fixed, so that it is possible to connect the connector housing 50 to the terminal block part 30A more strongly. As illustrated in FIG. 2A and FIG. 2B, tips 52a of two first protrusion parts 52 and tips 53a of two second protrusion parts 53 that protrude from the terminal block part 30A are caulking-fixed, so that it is possible to improve a strength of connection of the connector housing 50 to the terminal block part 30A. Furthermore, the tip 52a of the first protrusion part 52 or the tip 53a of the second protrusion part 53 may be welded to and fixed on the terminal block part 30A.

Figure 3A:
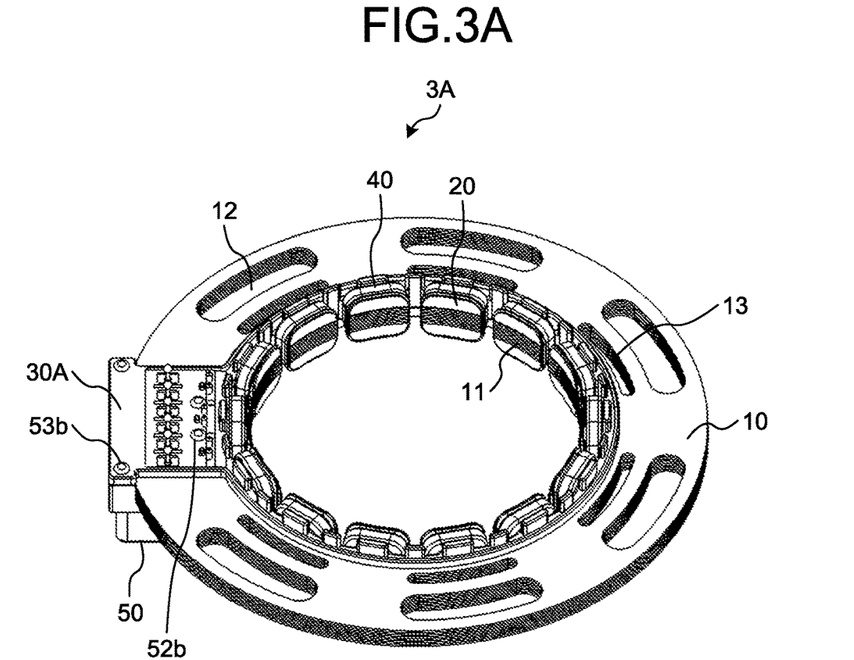
FIG. 3A is a perspective view illustrating a stator according to a first embodiment when viewed from a top surface thereof.
Figure 3B:
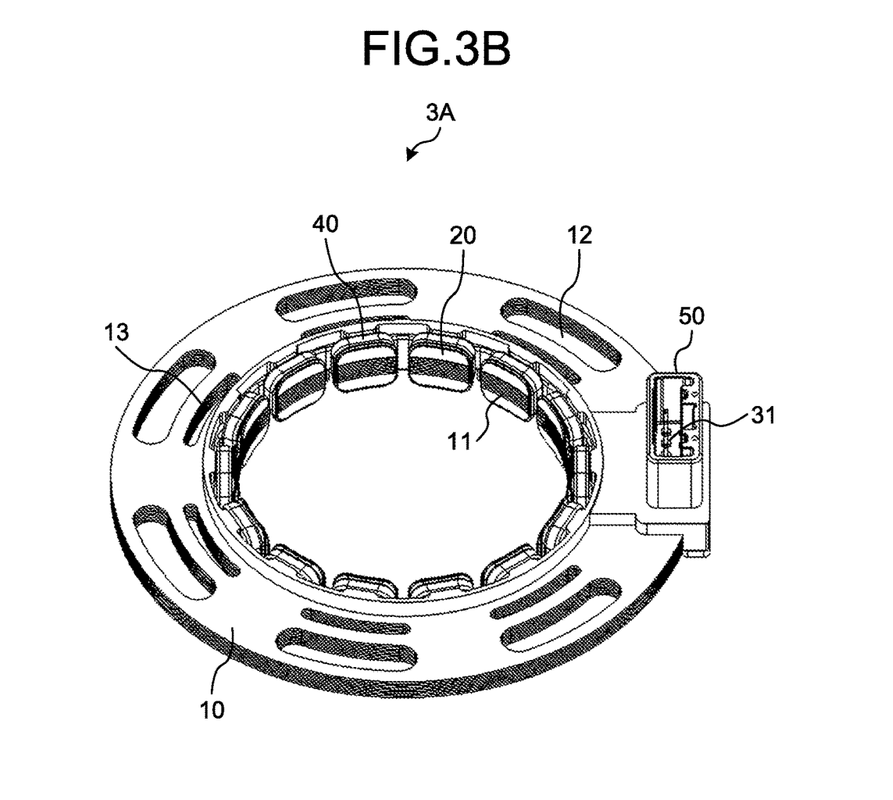
FIG. 3B is a perspective view illustrating a stator according to a first embodiment when viewed from a bottom surface thereof.
Figure 4A:
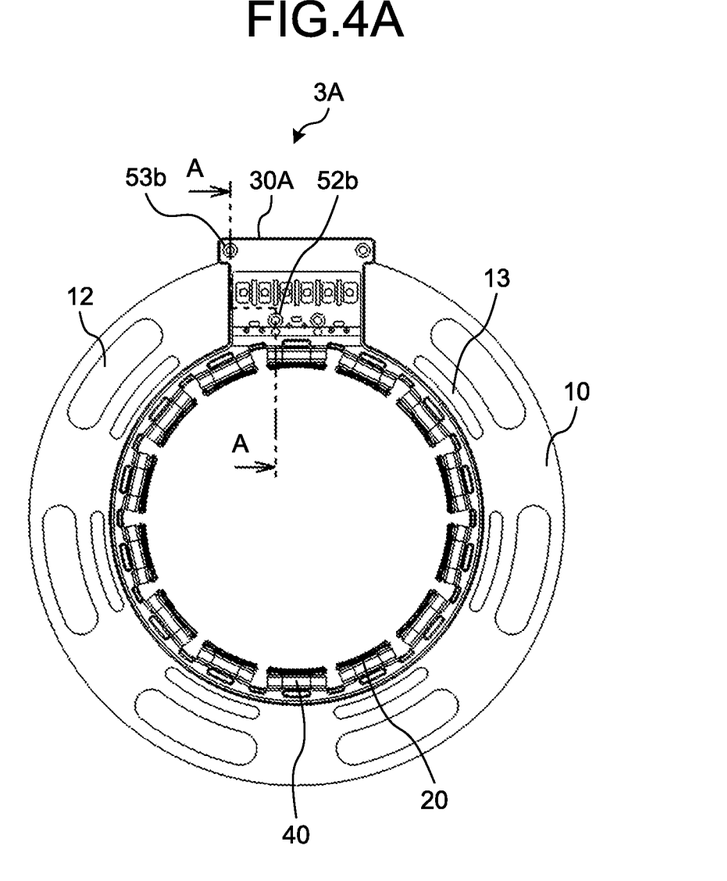
FIG. 4A is a plan view illustrating a stator according to a first embodiment.
Figure 4B:
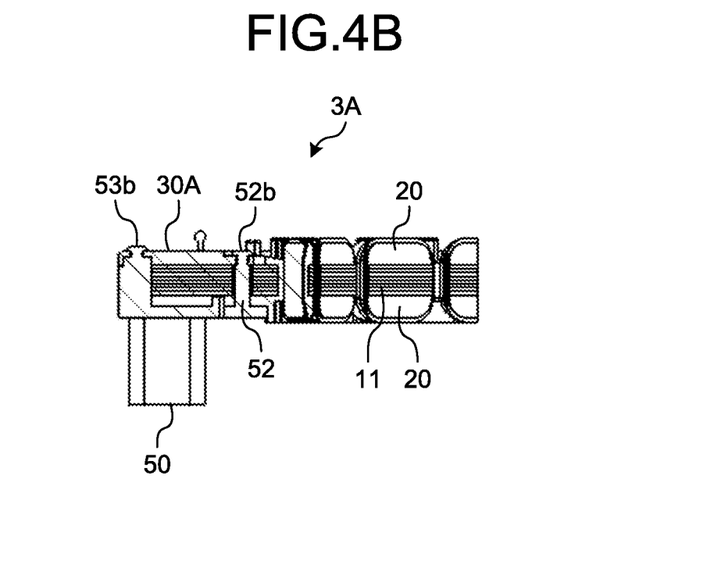
FIG. 4B is a cross-sectional view illustrating a stator according to a first embodiment along line A-A as illustrated in FIG. 4A.

FIG. 3A is a perspective view illustrating a stator 3A according to the first embodiment when viewed from a top surface thereof. FIG. 3B is a perspective view illustrating a stator 3A according to the first embodiment when viewed from a bottom surface thereof. FIG. 4A is a plan view illustrating a stator 3A according to the first embodiment. FIG. 4B is a cross-sectional view illustrating a stator 3A according to the first embodiment along line A-A as illustrated in FIG. 4A. FIG. 3A, FIG. 3B, FIG. 4A, and FIG. 4B illustrate a stator 3A after a connector housing 50 is connected to a terminal block part 30A.

As illustrated in FIG. 3A to FIG. 4B, in the stator 3A, a tip 52a of a first protrusion part 52 that penetrates through a through-hole 13 of a stator core 10 and a first through-hole 32 is fixed on a terminal block part 30A on a side of one end of a plurality of terminals 31. In the stator 3A as illustrated in FIG. 3A to FIG. 4B, the tip 52a of the first protrusion part 52 is caulking-fixed on the terminal block part 30A, so that a caulking part 52b is formed on the terminal block part 30A.

As illustrated in FIG. 3A to FIG. 4B, in the stator 3A, a tip 53a of a second protrusion part 53 that penetrates through a second through-hole 33 is fixed on the terminal block part 30A on a side of one end of the plurality of terminals 31. In the stator 3A as illustrated in FIG. 3A to FIG. 4B, the tip 53a of the second protrusion part 53 is caulking-fixed on the terminal block part 30A, so that a caulking part 53b is formed on the terminal block part 30A.

Thus, a connector housing 50 that is formed separately from the terminal block part 30A that is formed integrally with an insulator 20 is connected to the terminal block part 30A that is formed integrally with the insulator 20 on a side of another end of the plurality of terminals 31.

As described above, according to the first embodiment, a stator 3A includes a connector housing 50 that has a connection part for a terminal block part 30A that is formed integrally with an insulator 20, stores another end of each of a plurality of terminals 31, and is connected to an external connector. In the stator 3A according to the first embodiment, it is possible to form the connector housing 50 separately from, and connect it to, the terminal block part 30A that is formed integrally with the insulator 20. Hence, for example, a specification, such as a shape, of the connector housing 50 that is connected to an external connector may be changed with a change in a specification (for example, a change in a model, a type, or a customer) of an external connector. In such a case, only the connector housing 50 is changed, so that it is possible to deal with various specifications of an external connector. Accordingly, it is possible to standardize the stator core 10, the insulator 20, and the terminal block part 30A. That is, it is sufficient to change a die for molding the connector housing 50. In such a case, it is possible to standardize a die for forming the stator core 10, the insulator 20, and the terminal block part 30A without changing a die for forming the stator core 10, the insulator 20, and the terminal block part 30A. Hence, it is possible to reduce a manufacturing cost of the stator 3A. Accordingly, it is possible to reduce a manufacturing cost of a resolver 1.

According to the first embodiment, in the stator 3A, a through-hole 13 is formed in a body part of the stator core 10 in a circumferential direction thereof. A first through-hole 32 that overlaps with the through-hole 13 of the stator core 10 is formed in the terminal block part 30A. The connector housing 50 has, as a connection part, a first protrusion part 52 that is formed so as to penetrate through the through-hole 13 of the stator core 10 and the first through-hole 32. A tip 52a of the first protrusion part 52 that penetrates through the through-hole 13 of the stator core 10 and the first through-hole 32 is fixed on the terminal block part 30A. Hence, in the stator 3A according to the first embodiment, a space for the through-hole 13 that is originally formed in the stator core 10 is utilized, so that it is possible to readily connect the connector housing 50 to the terminal block part 30A.

According to the first embodiment, in the stator 3A, two first through-holes 32 that are provided so as to be positioned at both ends of the through-hole 13 of the stator core 10 are formed in the terminal block part 30A. Two first protrusion parts 52 are formed on the connector housing 50 at positions that correspond to the two first through-holes 32 that are provided so as to be positioned at both ends of the through-hole 13 of the stator core 10. In such a case, the connector housing 50 is connected to the terminal block part 30A at positions that correspond to both ends of the through-hole 13 of the stator core 10. Hence, it is possible to improve stability of connection of the connector housing 50 to the terminal block part 30A, for example, against stress that is caused in the connector housing 50 by coupling or removal of an external connector for the connector housing 50.

According to the first embodiment, in the stator 3A, a second through-hole 33 is formed in the terminal block part 30A so as to be positioned outside the stator core 10 in a radial direction opposite to one radial direction where a plurality of teeth 11 extend therein. The connector housing 50 has, as a connection part, a second protrusion part 53 that is formed so as to penetrate through the second through-hole 33. A tip 53a of the second protrusion part 53 that penetrates through the second through-hole 33 is fixed on the terminal block part 30A. Hence, in the stator 3A according to the first embodiment, a space outside the stator core 10 is utilized, so that it is possible to readily connect the connector housing 50 to the terminal block part 30A.

According to the first embodiment, in the stator 3A, two second through-holes 33 are formed in the terminal block part 30A so as to be positioned at both ends of the terminal block part 30A in a tangential direction of an outer circumference of the stator core 10. Two second protrusion parts 53 are formed on the connector housing 50 at positions that correspond to the two second through-holes 33 that are provided so as to be positioned at both ends of the terminal block part 30A in a tangential direction of an outer circumference of the stator core 10. Hence, it is possible to improve stability of connection of the connector housing 50 to the terminal block part 30A, for example, against stress that is caused in the connector housing 50 by coupling or removal of an external connector for the connector housing 50.

Second Embodiment

Figure 5A:
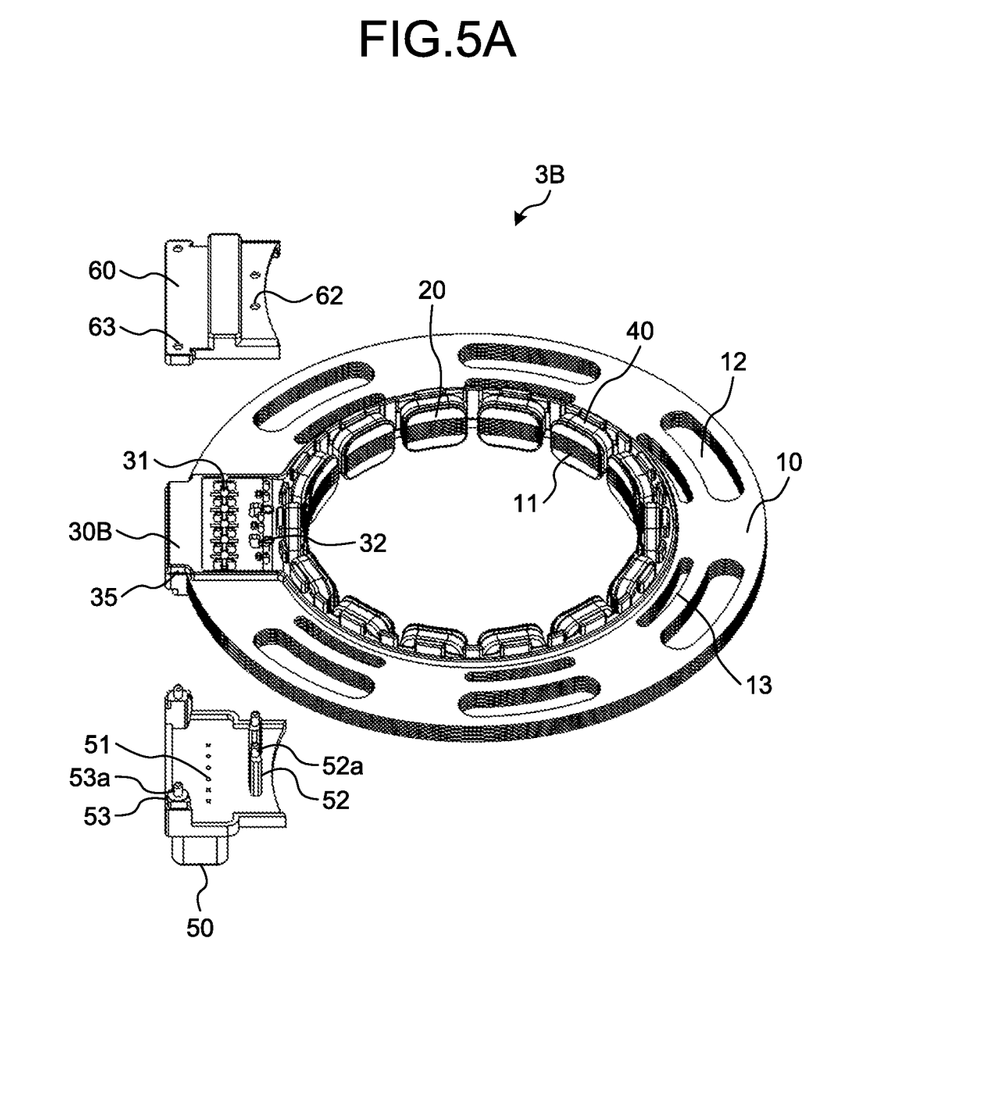
FIG. 5A is an exploded perspective view illustrating a stator according to a second embodiment when viewed from a top surface thereof.
Figure 5B:
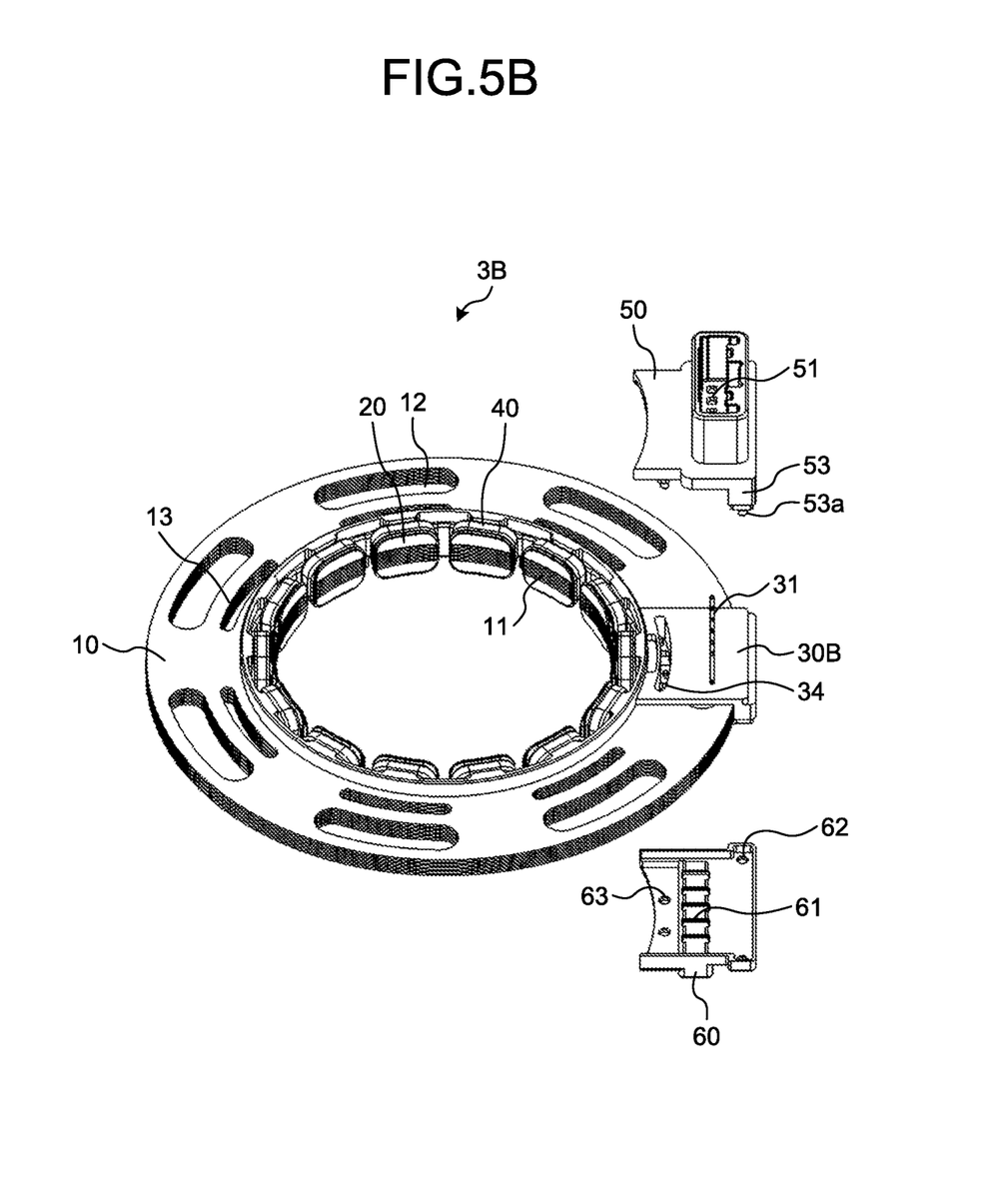
FIG. 5B is an exploded perspective view illustrating a stator according to a second embodiment when viewed from a bottom surface thereof.

FIG. 5A is an exploded perspective view illustrating a stator 3B according to a second embodiment when viewed from a top surface thereof. FIG. 5B is an exploded perspective view illustrating a stator 3B according to a second embodiment when viewed from a bottom surface thereof. FIG. 5A and FIG. 5B illustrate a stator 3B before a connector housing 50 is connected to a terminal block part 30B. In the following description(s), a part similar to a part as has already been described will be provided with a sign identical to that of the part as has already been described and a redundant description(s) thereof will be omitted.

A stator 3B according to the second embodiment is different from the stator 3A according to the first embodiment in that the stator 3B includes a terminal cover 60 and a connection part of a connector housing 50 is connected to the terminal cover 60 and the like.

As illustrated in FIG. 5A and FIG. 5B, a terminal block part 30B has a shape (a U-shape) so as to interpose a stator core 10 from an outside in a radial direction of the stator core 10. A plurality of terminals (terminal pins) 31 are implanted in the terminal block part 30B. A terminal end of a winding wire that composes a corresponding coil 40 is bounded to one end of each of the terminals 31. Another end of each of the terminals 31 protrudes into an interior of a connector housing 50.

A first through-hole 32 that overlaps with a through-hole 13 of the stator core 10 is formed in the terminal block part 30B on a side of one end of the plurality of terminals 31. In the terminal block part 30B as illustrated in FIG. 5A and FIG. 5B, two first through-holes 32 are formed so as to be positioned at both ends of the through-hole 13 of the stator core 10. The number of first through-holes 32 that are formed in the terminal block part 30B is not particularly limited and the number of first through-holes 32 may be one or greater than or equal to three.

A through-hole 34 is formed in the terminal block part 30B on a side of another end of the plurality of terminals 31. The through-hole 34 has a shape that corresponds to a shape of the through-hole 13 of the stator core 10. Shapes and the number of through-holes 34 are not particularly limited as long as it is possible to insert a first protrusion part 52 that is provided on the connector housing 50 through the first through-hole 32. For example, shapes and the number of through-holes 34 may correspond to shapes and the number of first through-holes 32, respectively.

As illustrated in FIG. 5A and FIG. 5B, the stator 3B according to the second embodiment further includes a terminal cover 60 that covers the plurality of terminals 31 from a side of one end of the plurality of terminals 31. The terminal cover 60 has a shape (a substantially square shape) that corresponds to a shape of the terminal block part 30B so as to cover the terminal block part 30B as well as the plurality of terminals 31 that are provided on the terminal block part 30B. The terminal cover 60 has a plurality of isolation members (partition plates) 61 that are provided in an interior of the terminal cover 60 on a side that faces the plurality of terminals 31. The plurality of terminals 31 are mutually separated by spaces that are formed by the plurality of isolation members 61. The plurality of terminals 31 are stored in spaces that are formed by the plurality of isolation members 61. Thereby, it is possible to prevent the plurality of terminals 31 from being electrically short-circuited by a foreign substance that penetrates into the stator 3B.

A third through-hole 62 that overlaps with the first through-hole 32 is formed in the terminal cover 60. Positions, shapes, and the number of third through-holes 62 correspond to positions, shapes, and the number of first through-holes 32, respectively, in such a manner that the third through-holes 62 overlap with the first through-holes 32. In the terminal cover 60 as illustrated in FIG. 5A and FIG. 5B, two third through-holes 62 are formed at positions that correspond to two first through-holes 32 that are provided so as to be positioned at both ends of the through-hole 13 of the stator core 10.

A four through-hole 63 is formed in the terminal cover 60 in a radial direction opposite to one radial direction where the plurality of teeth 11 extend therein, that is, outward in a radial direction of the stator core 10, so as to be positioned outside the stator core 10. In the terminal cover 60 as illustrated in FIG. 5A and FIG. 5B, two fourth through-holes 63 are formed so as to be positioned at both ends of the terminal cover 60 in a tangential direction of an outer circumference of the stator core 10. The number of fourth through-holes 63 that are formed in the terminal cover 60 is not particularly limited and the number of fourth through-holes 63 may be one or greater than or equal to three.

An interior of the terminal cover 60 may be filled with a varnish. In a case where an interior of the terminal cover 60 may be filled with a varnish, it is possible to prevent corrosion of a terminal end of a winding wire that is bounded to the plurality of terminals 31 that are covered with the terminal cover 60.

The connector housing 50 is a housing member for storing another end of each of the plurality of terminals 31. The connector housing 50 has a connection part for connecting to the terminal cover 60. A connection part of the connector housing 50 is connected to the terminal cover 60 so as to be connected to the terminal block part 30B. The connector housing 50 is connected to the terminal block part 30B on a side of another end of the plurality of terminals 31. As the connector housing 50 is connected to the terminal block part 30B, the connector housing 50 composes a male type connector that connects another end of the plurality of terminals 31 to a non-illustrated female type external connector.

The connector housing 50 has a plurality of through-holes 51 for inserting the plurality of terminals 31 therethrough at positions that correspond to the plurality of terminals 31. As the connector housing 50 is connected to the terminal block part 30B, another end of each of the terminals 31 protrudes into an interior of the connector housing 50 through the plurality of through-holes 51. Shapes and the number of the plurality of through-holes 51 correspond to shapes and the number of the plurality of terminals 31, respectively, so as to insert the plurality of terminals 31 through the connector housing 50.

The connector housing 50 has, as a connection part, a first protrusion part 52 that is formed so as to penetrate through the through-hole 13 of the stator core 10, the first through-hole 32, and the third through-hole 62. Positions, shapes, and the number of first protrusion parts 52 correspond to positions, shapes, and the number of first through-holes 32 and third through-holes 62, respectively, in such a manner that the first protrusion parts 52 penetrate through the through-hole 13 of the stator core 10, the first through-holes 32, and the third through-holes 62. The first protrusion part 52 has a shape in such a manner that a tip 52a of the first protrusion part 52 penetrates through the through-hole 13 of the stator core 10, the first through-hole 32, and the third through-hole 62 and protrudes from the terminal cover 60 on an opposite side of a side of the terminal block part 30B. In the connector housing 50 as illustrated in FIG. 5A and FIG. 5B, the first protrusion part 52 includes two tips 52a that have a cylindrical shape (a pin shape). More specifically, two first protrusion parts 52 are formed on the connector housing 50 at positions that correspond to two first through-holes 32 and two third through-holes 62 that are provided so as to be positioned at both ends of the through-hole 13 of the stator core 10.

The connector housing 50 has, as a connection part, a second protrusion part 53 that is formed so as to penetrate through a fourth through-hole 63. Positions, shapes, and the number of second protrusion parts 53 correspond to positions, shapes, and the number of fourth through holes 63, respectively, in such a manner that the second protrusion parts 53 penetrate through the fourth through-holes 63. The second protrusion part 53 has a shape in such a manner that a tip 53*a* of the second protrusion part 53 penetrates through the fourth through-hole 63 and protrudes from the terminal cover 60 on an opposite side of a side of the terminal block part 30B. In the connector housing 50 as illustrated in FIG. 5A and FIG. 5B, the second protrusion part 53 includes two tips 53*a* that have a cylindrical shape (a pin shape). More specifically, two second protrusion parts 53 are formed on the connector housing 50 at positions that correspond to two fourth through-holes 63 that are provided so as to be positioned at both ends of the terminal block part 30B in a tangential direction of an outer circumference of the stator core 10.

A connection part of the connector housing 50 is connected to the terminal cover 60, so that, as the connector housing 50 is connected to the terminal block part 30B, the tip 52*a* of the first protrusion part 52 penetrates through the through-hole 13 of the stator core 10, the first through-hole 32, and the third through-hole 62 and protrudes from the terminal cover 60 on an opposite side of a side of the terminal block part 30B. The tip 52*a* of the first protrusion part 52 that penetrates through the through-hole 13 of the stator core 10, the first through-hole 32, and the third through-hole 62 and protrudes from the terminal cover 60 is fixed on the terminal cover 60 on an opposite side of a side of the terminal block part 30B.

A connection part of the connector housing 50 is connected to the terminal cover 60, so that, as the connector housing 50 is connected to the terminal block part 30B, the tip 53*a* of the second protrusion part 53 penetrates through the fourth through-hole 63 and protrudes from the terminal cover 60 on an opposite side of a side of the terminal block part 30B. The tip 53*a* of the second protrusion part 53 that penetrates through the fourth through-hole 63 and protrudes from the terminal cover 60 is fixed on the terminal cover 60 on an opposite side of a side of the terminal block part 30B.

For a method of fixing the tip 52*a* of the first protrusion part 52 or the tip 53*a* of the second protrusion part 53 that protrudes from the terminal cover 60, caulking fixation is provided such as thermal caulking, infrared caulking, or ultrasonic caulking. The tip 52*a* of the first protrusion part 52 or the tip 53*a* of the second protrusion part 53 that protrudes from the terminal cover 60 is caulking-fixed, so that it is possible to connect the connector housing 50 to the terminal cover 60 more strongly. As illustrated in FIG. 5A and FIG. 5B, tips 52*a* of two first protrusion parts 52 or tips 53*a* of two second protrusion parts 53 that protrude from the terminal cover 60 are caulking-fixed, so that it is possible to improve a strength of connection of the connector housing 50 to the terminal cover 60. Furthermore, the tip 52*a* of the first protrusion part 52 or the tip 53*a* of the second protrusion part 53 may be welded to and fixed on the terminal cover 60.

The terminal block part 30B has a guide part 35 that guides the second protrusion part 53 in such a manner that the second protrusion part 53 penetrates through the fourth through-hole 63. Positions, shapes, and the number of guide parts 35 correspond to positions, shapes, and the number of fourth through-holes 63, respectively, in such a manner that it is possible for the guide parts 35 to guide second protrusion parts 53 in such a manner that the second protrusion parts 53 penetrates through the fourth through-holes 63.

The guide part 35 has a shape in such a manner that, as the second protrusion part 53 of the connector housing 50 is connected to the terminal cover 60, a surface of the guide part 35 is capable of contacting, and sliding on, a surface of the second protrusion part 53. The guide part 35 has, for example, a shape similar to a shape of a part of a cross-section of the second protrusion part 53 on a plane that is orthogonal to an axial direction thereof. The guide part 35 has, for example, a shape of two adjacent sides of a cross-section of the second protrusion part 53 that has a prismatic shape or an arc shape on a plane that is orthogonal to an axial direction thereof.

The terminal block part 30B as illustrated in FIG. 5A and FIG. 5B has two guide parts 35 that correspond to two second protrusion parts 53 of the connector housing 50. More specifically, the terminal block part 30B has two guide parts 35 at positions that correspond to two second protrusion parts 53 that are provided to be positioned at both ends of the terminal block part 30B in a tangential direction of an outer circumference of the stator core 10.

Figure 6:
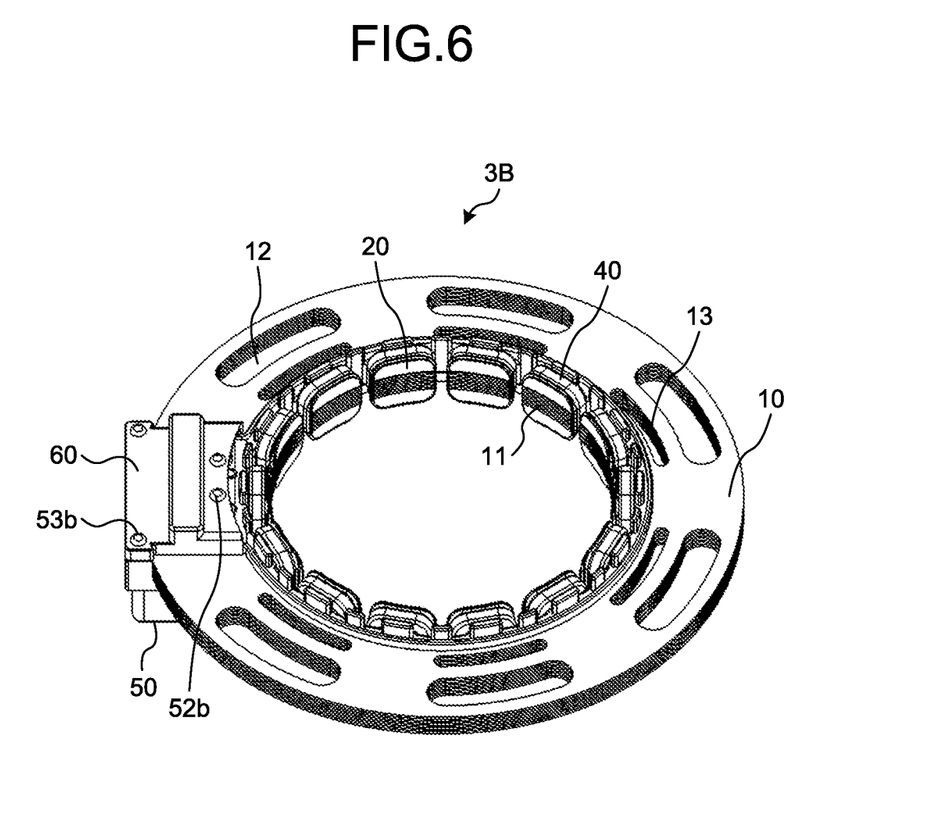
FIG. 6 is a perspective view of a stator according to a second embodiment.
Figure 7A:
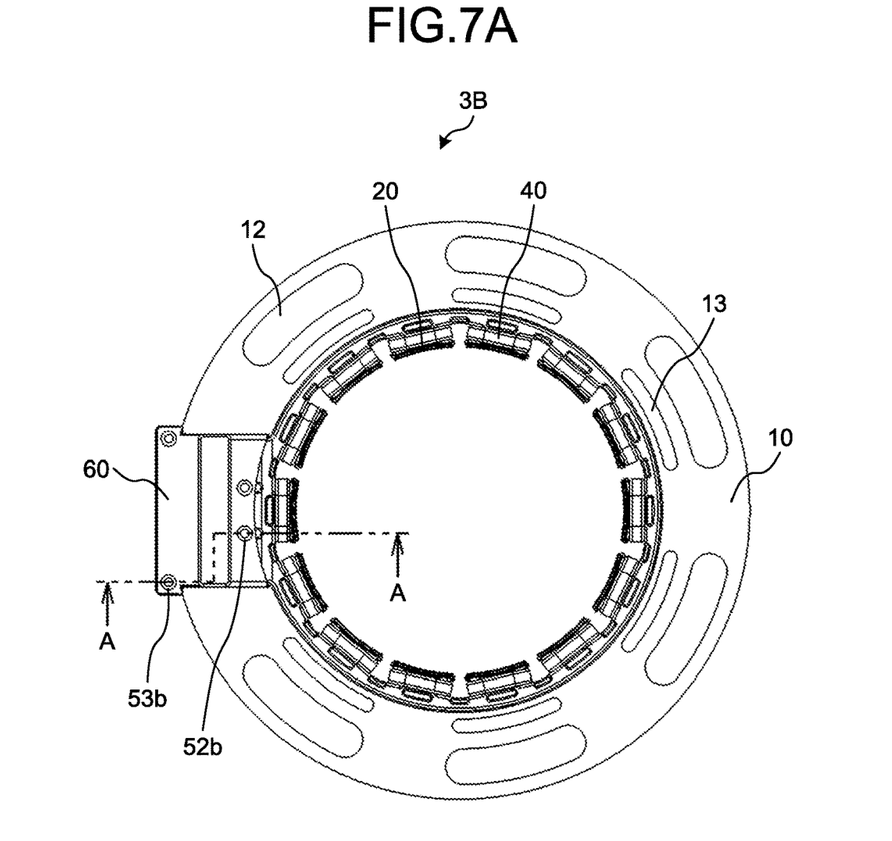
FIG. 7A is a plan view illustrating a stator according to a second embodiment.
Figure 7B:
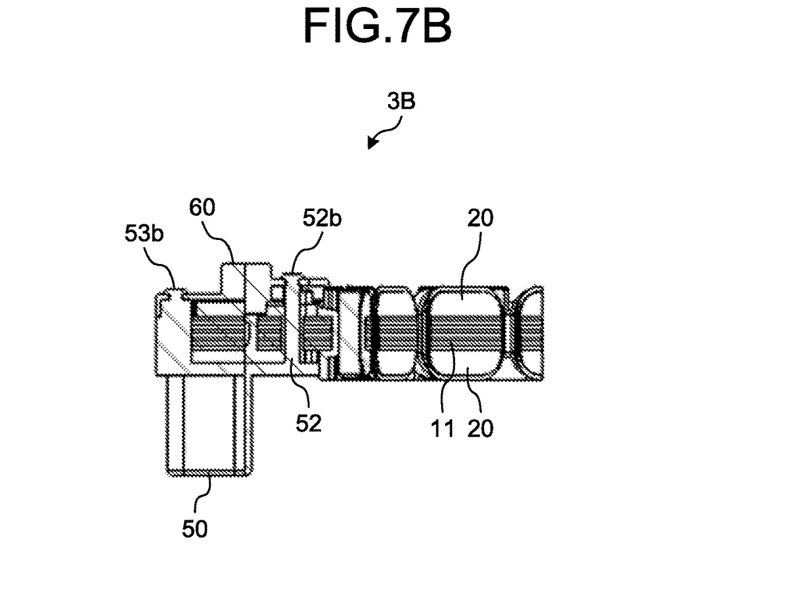
FIG. 7B is a cross-sectional view illustrating a stator according to a second embodiment along line A-A as illustrated in FIG. 7A.

FIG. 6 is a perspective view of a stator 3B according to the second embodiment. FIG. 7A is a plan view illustrating a stator 3B according to the second embodiment. FIG. 7B is a cross-sectional view illustrating a stator 3*b* according to the second embodiment along line A-A as illustrated in FIG. 7A. FIG. 6, FIG. 7A, and FIG. 7B illustrate a stator 3B after the connector housing 50 is connected to a terminal block part 30B.

As illustrated in FIG. 6 to FIG. 7B, in the stator 3B, a tip 52*a* of a first protrusion part 52 that penetrates through a through-hole 13 of a stator core 10, a first through-hole 32, and a third through-hole 62 and protrudes from a terminal cover 60 is fixed on the terminal cover 60 on an opposite side of a side of a terminal block part 30B. In the stator 3B as illustrated in FIG. 6 to FIG. 7B, the tip 52*a* of the first protrusion part 52 is caulking-fixed on the terminal cover 60, so that a caulking part 52*b* is formed on the terminal cover 60.

As illustrated in FIG. 6 to FIG. 7B, in the stator 3B, a tip 53*a* of a second protrusion part 53 that penetrates through a fourth through-hole 63 and protrudes from the terminal cover 60 is fixed on the terminal cover 60 on an opposite side of a side of the terminal block part 30B. In the stator 3B as illustrated in FIG. 6 to FIG. 7B, the tip 53*a* of the second protrusion part 53 is caulking-fixed on the terminal cover 60, so that a caulking part 53*b* is formed on the terminal cover 60.

Thus, a connection part of a connector housing 50 that is formed separately from the terminal block part 30B that is formed integrally with an insulator 20 is connected to the terminal cover 60 that is arranged on an opposite side of the terminal block part 30B. Accordingly, the connector housing 50 is connected to the terminal block part 30B that is formed integrally with the insulator 20 on a side of another end of a plurality of terminals 31.

According to the second embodiment, a stator 3B further include a terminal cover 60 that covers a plurality of terminals 31 from a side of one end of the plurality of terminals 31. A connection part of a connector housing 50 is connected to the terminal cover 60 so as to be connected to a terminal block part 30B. Hence, in the stator 3B according to the second embodiment, a connection part of the connector housing 50 is connected to the terminal cover 60, so that it is possible to protect the plurality of terminals 31 that are provided on the terminal block part 30B and connect the connector housing 50 to the terminal block part 30B.

According to the second embodiment, in the stator 3B, a first through-hole 32 that overlaps with a through-hole 13 of a stator core 10 is formed in the terminal block part 30B. A third through-hole 62 that overlaps with the first through-hole 32 is formed in the terminal cover 60. The connector housing 50 has, as a connection part, a first protrusion part 52 that is formed so as to penetrate through the through-hole 13 of the stator core 10, the first through-hole 32, and the third through-hole 62. A tip 52a of the first protrusion part 52 that penetrates through the through-hole 13 of the stator core 10, the first through-hole 32, and the third through-hole 62 is fixed on the terminal cover 60. Hence, in the stator 3B according to the second embodiment, a space for the through-hole 13 that is originally formed in the stator core 10 is utilized, so that it is possible to readily connect the first protrusion part 52 of the connector housing 50 to the terminal cover 60.

According to the second embodiment, in the stator 3B, two third through-holes 62 are formed in the terminal cover 60 at positions that correspond to two first through-holes 32 that are provided so as to be positioned at both ends of the through-hole 13 of the stator core 10. Two first protrusion parts 52 are formed on the connector housing 50 at positions that correspond to the two first through-holes 32 and the two third through-holes 62 that are provided so as to be positioned at both ends of the through-hole 13 of the stator core 10. In such a case, the first protrusion part 52 of the connector housing 50 is connected to the terminal cover 60 at positions that correspond to both ends of the through-hole 13 of the stator core 10. Hence, it is possible to improve stability of connection of the connector housing 50 to the terminal cover 60, for example, against stress that is caused in the connector housing 50 by coupling or removal of an external connector for the connector housing 50.

According to the second embodiment, in the stator 3B, a fourth through-hole 63 is formed in the terminal cover 60 so as to be positioned outside the stator core 10 in a radial direction opposite to one radial direction where a plurality of teeth 11 extend therein. The connector housing 50 has, as a connection part, a second protrusion part 53 that is formed so as to penetrate through the fourth through-hole 63. A tip 53a of the second protrusion part 53 that penetrates through the fourth through-hole 63 is fixed on the terminal cover 60. Hence, in the stator 3B according to the second embodiment, a space outside the stator core 10 is utilized, so that it is possible to readily connect the second protrusion part 53 of the connector housing 50 to the terminal cover 60.

According to the second embodiment, in the stator 3B, two fourth through-holes 63 are formed in the terminal cover 60 so as to be positioned at both ends of the terminal cover 60 in a tangential direction of an outer circumference of the stator core 10. Two second protrusion parts 53 are formed on the connector housing 50 at positions that correspond to the two fourth through-holes 63 that are provided so as to be positioned at both ends of the terminal block part 30B in a tangential direction of an outer circumference of the stator core 10. Hence, it is possible to improve stability of connection of the connector housing 50 to the terminal cover 60, for example, against a stress that is caused in the connector housing 50 by coupling or removal of an external connector for the connector housing 50.

According to the second embodiment, in the stator 3B, the terminal block part 30B has a guide part 35 that guides the second protrusion part 53 in such a manner that the second protrusion part 53 penetrates through the fourth through-hole 63. Hence, the guide part 35 that is provided on the terminal block part 30B is utilized, so that it is possible to readily position the second protrusion part 53 of the connector housing 50 with respect to the fourth through-hole 63 of the terminal cover 60. Accordingly, it is possible to readily connect the second protrusion part 53 of the connector housing 50 to the terminal cover 60.

Figure 8:
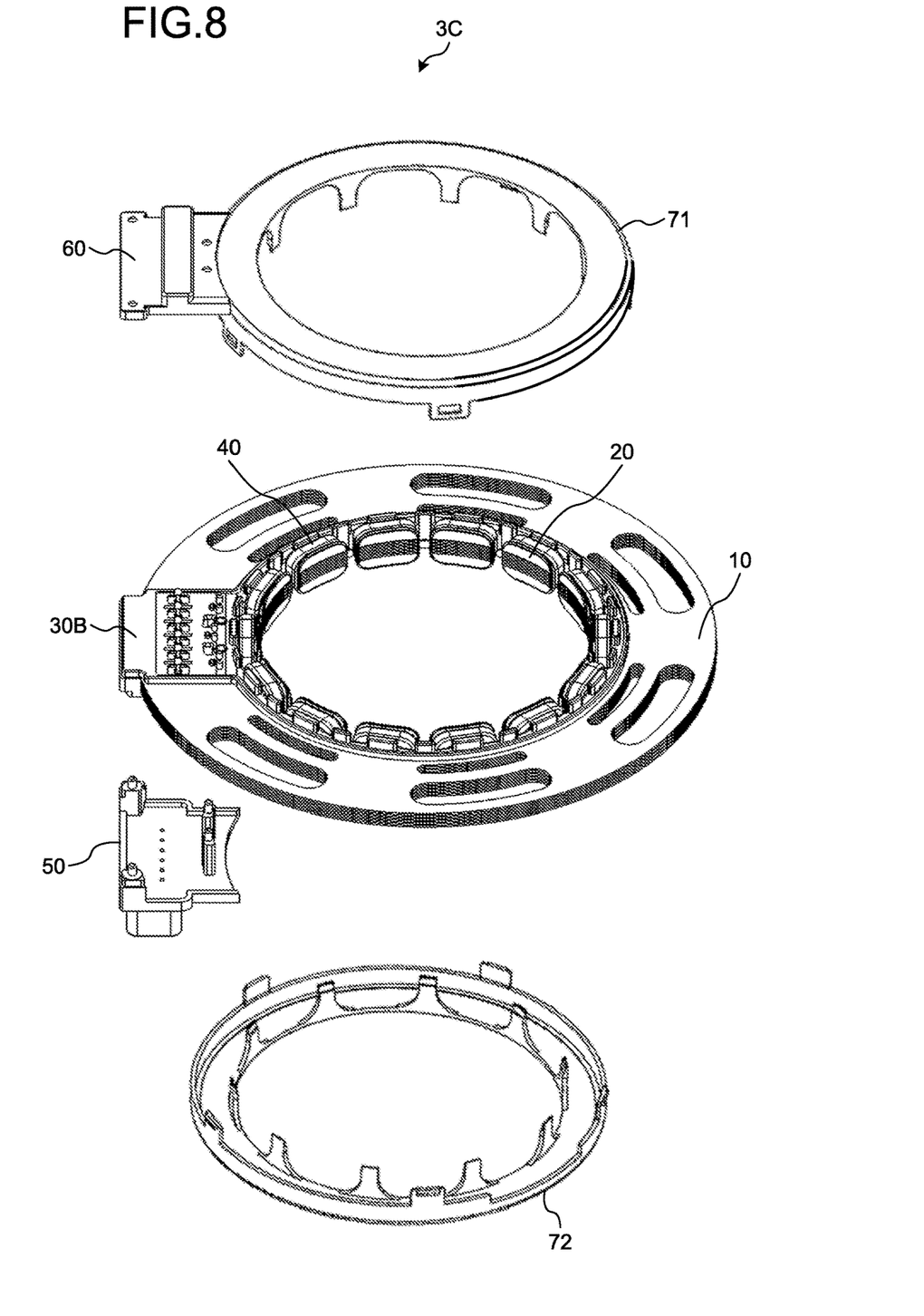
FIG. 8 is a diagram illustrating another configuration example of a stator according to a second embodiment.

FIG. 8 is a diagram illustrating another configuration example (a stator 3C) of the stator 3B according to the second embodiment. A stator 3C is different from the stator 3B in that the stator 3C includes a first coil cover 71 and a second coil cover 72.

A material of a first coil cover 71 and a second coil cover 72 is not particularly limited and they are formed of, for example, a resin. The first coil cover 71 and the second coil cover 72 are molded by means of, for example, injection molding of a resin. For a resin, it is possible to use, for example, a resin with an insulation property.

As illustrated in FIG. 8, the first coil cover 71 and the second coil cover 72 cover a coil 40 from both sides of the stator core 10 in an axial direction thereof, so as to protect the coil 40. As illustrated in FIG. 8, the first coil cover 71 is mounted on the coil 40 from an upper side thereof. The second coil cover 72 is mounted on the coil 40 from a lower side thereof.

In the stator 3C, a terminal cover 60 is formed integrally with the first coil cover 71 that covers the coil 40. That is, the terminal cover 60 and the first coil cover 71 are molded by means of injection molding of a resin such as a resin with an insulation property.

In the stator 3C, the terminal cover 60 is formed integrally with the first coil cover 71 that covers the coil 40, so that it is possible to readily mount a cover that protects a plurality of terminals 31 and the coil 40 on the stator 3C.

Although a plurality of terminals 31 are pins that are straight bars and another end of the plurality of terminals 31 that are arraigned in a connector housing 50 protrudes in an axial direction of a stator core 10 in the embodiment(s) as described above, shapes of the plurality of terminals 31 are not particularly limited. For example, it is possible to use a plurality of L-shaped pins as the plurality of terminals 31. In such a case, a plurality of L-shaped pins may be provided in such a manner that another end of such a plurality of L-shaped pins that are arranged in the connector housing 50 protrudes outward in a radial direction.

Although a case where a resolver 1 is an inner rotor type resolver has been described in the embodiment(s) as described above, it is also possible to apply the embodiment(s) as described above to an outer rotor type resolver. In an outer rotor type resolver, a rotor is arranged outside a stator core that has a plurality of teeth that extend outward in a radial direction from a ring-shaped body part thereof. A terminal block part extends inward in a radial direction from an insulator. In an outer rotor type resolver, a connector housing that is connected to an external connector is also formed separately from an insulator. A connector housing has a connection part for a terminal block part at a position that corresponds to an inside of a stator core, so as to be connected to the terminal block part inside the stator core.

According to an aspect of the present invention, it is possible to reduce a manufacturing cost. For example, it is possible to provide a stator and a resolver that are capable of reducing a manufacturing cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A stator, comprising:
a stator core that includes a plurality of teeth that extend from a ring-shaped body part in one radial direction thereof;
an insulator that covers the plurality of teeth from both sides in an axial direction of the stator core;
a coil that is wound around each of the plurality of teeth via the insulator;
a terminal block part that extends from the insulator in a radial direction opposite to the one radial direction, includes a plurality of terminals with a terminal end of a winding wire that composes the coil being bound to one end thereof, and is formed integrally with the insulator;
a connector housing that includes a connection part for the terminal block part, stores another end of each of the plurality of terminals, and is connected to an external connector; and
a terminal cover that covers the plurality of terminals from a side of the one end of the plurality of terminals, wherein
a first through-hole that overlaps with a through-hole of the stator core is formed in the terminal block part;
a third through-hole that overlaps with the first through-hole is formed in the terminal cover;
the connector housing includes, as the connection part, a first protrusion part that is formed to penetrate through the through-hole of the stator core, the first through-hole, and the third through-hole; and
a tip of the first protrusion part that penetrates through the through-hole of the stator core, the first through-hole, and the third through-hole is fixed on the terminal cover and thereby connected to the terminal block part.

2. The stator according to claim 1, wherein:
a fourth through-hole is formed in the terminal cover to be positioned outside the stator core in the opposite radial direction;
the connector housing includes, as another connection part, a second protrusion part that is formed to penetrate through the fourth through-hole; and
a tip of the second protrusion part that penetrates through the fourth through-hole is fixed on the terminal cover and thereby connected to the terminal block part.

3. The stator according to claim 2, wherein the terminal block part includes a guide part that guides the second protrusion part in such a manner that the second protrusion part penetrates through the fourth through-hole.

4. The stator according to claim 1, wherein the terminal cover is formed integrally with a coil cover that covers the coil.

5. A resolver, comprising:
a rotor; and
a stator,
wherein the stator includes:
a stator core that includes a plurality of teeth that extend from a ring-shaped body part in one radial direction thereof;
an insulator that covers the plurality of teeth from both sides in an axial direction of the stator core;
a coil that is wound around each of the plurality of teeth via the insulator;
a terminal block part that extends from the insulator in a radial direction opposite to the one radial direction, includes a plurality of terminals with a terminal end of a winding wire that composes the coil being bound to one end thereof, and is formed integrally with the insulator;
a connector housing that includes a connection part for the terminal block part, stores another end of each of the plurality of terminals, and is connected to an external connector, and
a terminal cover that covers the plurality of terminals from a side of the one end of the plurality of terminals, wherein
a first through-hole that overlaps with a through-hole of the stator core is formed in the terminal block part;
a third through-hole that overlaps with the first through-hole is formed in the terminal cover;
the connector housing includes, as the connection part, a first protrusion part that is formed to penetrate through the through-hole of the stator core, the first through-hole, and the third through-hole; and
a tip of the first protrusion part that penetrates through the through-hole of the stator core, the first through-hole, and the third through-hole is fixed on the terminal cover and thereby connected to the terminal block part.

6. The resolver according to claim 5, wherein the terminal cover is formed integrally with a coil cover that covers the coil.

7. A stator, comprising:
a stator core that includes a plurality of teeth that extend from a ring-shaped body part in one radial direction thereof;
an insulator that covers the plurality of teeth from both sides in an axial direction of the stator core;
a coil that is wound around each of the plurality of teeth via the insulator;
a terminal block part that extends from the insulator in a radial direction opposite to the one radial direction, includes a plurality of terminals with a terminal end of a winding wire that composes the coil being bound to one end thereof, and is formed integrally with the insulator;
a connector housing that includes a connection part for the terminal block part, stores another end of each of the plurality of terminals, and is connected to an external connector; and
a terminal cover that covers the plurality of terminals from a side of the one end of the plurality of terminals, wherein
a fourth through-hole is formed in the terminal cover to be positioned outside the stator core in the opposite radial direction;
the connector housing includes, as the connection part, a second protrusion part that is formed to penetrate through the fourth through-hole; and
a tip of the second protrusion part that penetrates through the fourth through-hole is fixed on the terminal cover and thereby connected to the terminal block part.

8. The stator according to claim 7, wherein the terminal block part includes a guide part that guides the second protrusion part in such a manner that the second protrusion part penetrates through the fourth through-hole.

9. The stator according to claim 7, wherein the terminal cover is formed integrally with a coil cover that covers the coil.

* * * * *